United States Patent
Kanno (12)

(10) Patent No.: US 6,277,524 B1
(45) Date of Patent: Aug. 21, 2001

(54) LITHIUM-ION-CONDUCTIVE SOLID ELECTROLYTE AND SOLID-ELECTROLYTE LITHIUM BATTERY

(75) Inventor: Ryoji Kanno, Kobe (JP)

(73) Assignees: Toyota Jidosha Kabushiki Kaisha, Aichi-ken; Genesis Research Institute, Inc., Nagoya, both of (JP)

( * ) Notice: Subject to any disclaimer, the term of this patent is extended or adjusted under 35 U.S.C. 154(b) by 0 days.

(21) Appl. No.: 09/206,961

(22) Filed: Dec. 8, 1998

(30) Foreign Application Priority Data

Dec. 9, 1997 (JP) .................................................. 9-339169

(51) Int. Cl.$^7$ .............................. H01M 6/18; H01M 6/04
(52) U.S. Cl. ........................... 429/304; 429/344; 429/345
(58) Field of Search .................................... 429/206, 223, 429/304, 344, 345; 29/623.1

(56) References Cited

U.S. PATENT DOCUMENTS

| | | | |
|---|---|---|---|
| 5,455,206 | * | 10/1995 | Kaun .......................................... 501/1 |
| 5,538,810 | * | 7/1996 | Kaun ....................................... 429/129 |
| 5,595,842 | * | 1/1997 | Nakane et al. ......................... 429/223 |
| 5,677,086 | * | 10/1997 | Satoh et al. ............................ 429/223 |
| 5,824,284 | * | 10/1998 | Satoh et al. ............................ 423/594 |
| 6,022,640 | * | 2/2000 | Takada et al. .................... 429/231.95 |
| 6,066,417 | * | 5/2000 | Cho et al. .............................. 429/303 |

FOREIGN PATENT DOCUMENTS

| | | |
|---|---|---|
| 0 131 825 | 1/1985 | (EP) . |
| 0 469 574 | 2/1992 | (EP) . |
| 0 802 575 | * 10/1997 | (EP) . |
| 59-151770 | 8/1984 | (JP) . |
| 4-202024 | 7/1992 | (JP) . |
| 5-310418 | 11/1993 | (JP) . |
| 6-115911 | 4/1994 | (JP) . |

OTHER PUBLICATIONS

Solid State Ionics; Yamashita et al; "Thin Film preparation of the Li2S–GeS2–Ga2S3 glass system by sputtering"; vol. 89, pp. 299–304, 1996.*
Materials Research Society Symposium Proceedings/Crystallisation and Related Phenomena in Amorphous Materials; Akai et al; "Ionic Motion and structure of ion conductive glasses", vol. 321, pp. 191–196, 1994.*
Journal of the Electrochemical Society; Kennedy et al; "Preparation and Electrochemical Properties of the SiS2–P2S5–Li2S Glass Coformer System"; vol. 136, No. 9, pp. 2441–2443, Sep. 1989.*
Patents Abstracts of Japan, Appln. No. 57183323, Appln. Date: Oct. 19, 1982, Publ. No. 59073850, Publ. Date: Apr. 26, 1984, "Solid Electrolyte Battery", Sanyo Electric Co., Ltd.
"Thin–film preparation of the Li$_2$S–GeS$_2$–Ga$_2$S$_3$ glass system by sputtering", M. Yamashita et al., Solid State Ionics, vol. 89, 1996, pp. 299–304.
"Ionic Motion and Structure of Ion Conductive Glasses", T. Akai et al., Materials Research Society Symposium Proceedings, vol. 321, 1994, pp. 191–196.

(List continued on next page.)

Primary Examiner—Patrick Ryan
Assistant Examiner—Zidia T. Pittman
(74) Attorney, Agent, or Firm—Burns, Doane, Swecker & Mathis, LLP

(57) ABSTRACT

A lithium-ion-conductive solid electrolyte includes a lithium-ion-conductive substance expressed by a general formula Li$_2$S-GeS$_2$-X wherein "X" is at least one member selected from the group consisting of Ga$_2$S$_3$ and ZnS, or Li$_2$S-SiS$_2$-P$_2$S$_5$. It is superb in terms of stability and safety at elevated temperatures, since it is a crystalline solid of high ion conductivity. It can be applied to a solid electrolyte for lithium batteries.

16 Claims, 5 Drawing Sheets

OTHER PUBLICATIONS

"Preparation and Electrochemical Properties of the $SiS_2$–$P_2S_5$–$Li_2S$ Glass Coformer System", J.H. Kennedy et al., Journal of the Electrochemical Society, vol. 136, No. 9, Sep. 1989, pp. 2441–2443.

"The Mixed Glass Former Effect in the $Li_2S$ : $SiS_2$ : $GeS_2$ System", V.K. Deshpande et al., Materials Research Bulletin, vol. 23, No. 3, 1988, pp. 379–384.

"New Li Solid Electrolytes", R.D. Shannon, et al., Electrochimica Acta, 1977, vol. 22, pp. 783–796.

"Ionic Conductivity of Lithium Orthosilicate–Lithium Phosphate Solid Solutions", Y–W. Hu, et al., J. Electrochem. Soc.: Solid State Science and Technology, 1977, vol. 124, No. 8, pp. 1240–1242.

"Glass–Forming Region and Structure in $SiS_2$–$Li_2S$–LiX (X=Br,I)", J.H. Kennedy et al., Journal of Solid State Chemistry, 1987, vol. 69, pp. 252–257.

"New lithium ion conductors based on $Li_2S$–$SiS_2$ system", S. Kondo et al., Solid State Ionics, 1992, 53–56, pp. 1183–1186.

"Synthesis and Lithium Conductivities of $Li_2SiS_3$ and $Li_4SiS_4$", B.T. Ahn et al., Mat. Res. Bull., 1989, vol. 24, pp. 889–897.

"Ionic Conductivity of and Phase Transaction in Lithium Thiophosphate $Li_3PS_4$", M. Tachez, et al., Solid State Ionics, 1984, vol. 14, pp. 181–185.

"Das Teilsystem $Li_4SiO_4$–$Li_4GeO_4$", V. W. Gratzer et al., Zeitschrift Für Kristallographie, 1971, Bd. 133, S. 260–263.

"Candidate compounds with perovskite structure for high lithium ionic conductivity", Y. Inaguma et al., Solid State Ionics, 1994, 70/71, pp. 196–202.

"Crystal Structure and Ionic Conductivity of $Li_{14}Zn(GeO_4)_4$ and Other New $Li^+$ Superionic Conductors", H. Y–P. Hong, Mat. Res. Bul., 1978, vol. 13, pp. 117–124.

* cited by examiner

LITHIUM-ION-CONDUCTIVE SOLID ELECTROLYTE AND SOLID-ELECTROLYTE LITHIUM BATTERY

BACKGROUND OF THE INVENTION

1. Field of the Invention

The present invention relates to a lithium-ion-conductive substance which can be used as an electrolyte of solid electrochemical devices, such as solid-electrolyte batteries, capacitors and solid electro-chromic display units. Moreover, the present invention relates to a solid-electrolyte lithium battery as well.

2. Description of the Related Art

Solid-electrolyte lithium batteries of high safety have been developed as the new-generation lithium secondary battery. The materials for making the solid electrolytes are required to exhibit conductivity as high as possible, and to be stable chemically as well as electrochemically. Crystalline solid electrolytes are most desired materials in terms of stability. However, no crystalline substances of high conductivity have yet been discovered.

The studies on solid electrolytes are the history of investigative researches on how to stabilize the high ionic conduction, which is usually present at elevated temperatures, at low temperatures; and how to synthesize materials exhibiting the high ionic conduction at low temperatures. The researches started with crystalline substances, and have developed into glassy and polymeric substances.

In the development of the next-generation high-energy-density lithium battery, the following are reported: an inorganic glassy electrolyte of high ionic conductivity and of good chemical-and-electrochemical stability; an $Li_2S$-$SiS_2$-$Li_3PO_4$ solid electrolyte disclosed in Japanese Unexamined Patent Publication (KOKAI) No. 4-202,024; and an $Li_2S$-$GeS_2$-LiI glassy solid electrolyte disclosed in Japanese Unexamined Patent Publication (KOKAI) No. 59-151,770.

The advantages of the glassy solid electrolyte are as follows: it is easy to synthesize the glassy solid electrolyte; it is relatively easy to carry out the material designing of the glassy solid electrolyte; the glassy solid electrolyte exhibits the isotropic ionic conduction; and the glassy solid electrolyte can be readily turned into an actual electrolyte. In particular, when the cooling speed of the glassy solid electrolyte is controlled, the glassy solid electrolyte exhibits an expanded vitrification range so that it is possible to attain compositions and structures which are appropriate for the ionic conduction of lithium ion.

It has been said that the crystalline solid electrolytes and the amorphous solid electrolytes depend on different basic ideas in terms of the material designing. The amorphous solid electrolytes exhibit the degree of freedom in the material designing far greater than the crystalline solid electrolytes. However, if the crystalline solid electrolytes can form structures which are adequate for the ionic conduction, there can exist substances which are far superior to the amorphous solid polymer electrolytes in terms of the ionic conductivity and the chemical-and-electrochemical stability.

Crystalline $Rb_4Cu_{14}I_7Cl_{13}$ is a substance which has exhibited the maximum ion conductivity at room temperature so far. The ion conductivity of crystalline $Rb_4Cu_{14}I_7Cl_{13}$ is better than those of the corresponding glassy silver solid electrolytes and copper solid electrolytes by a couple of digits, and additionally is larger than those of liquid electrolytes at room temperature. Considering the relationship between the crystalline solid electrolytes and amorphous solid electrolytes, it is possible to think of the presence of corresponding crystalline solid electrolyte, since there exist the glassy solid electrolytes whose structures are based on $SiS_4$ and $PO_4$ tetrahedrons. Moreover, on the analogy of the silver or copper ion conductors, it is natural that such crystalline solid electrolyte would exhibit a much higher ion conductivity than the glassy substances.

A substance which is famous as a ceramics ion conductor is an oxide, which is usually referred to as "LISICON". In the substance, a framework structure is formed. The framework structure includes $SiO_4$, $PO_4$ and $ZnO_4$ tetrahedrons. Lithium ions diffuse in the framework structure. These oxide substances are well known, since they exist as minerals on the earth. However, crystalline substances whose structures are based on $SiS_4$ and $PS_4$ tetrahedrons have not been known yet to exist as such oxide substances, since they are not present in nature. Hence, the inventor of the present invention has decided to study these novel substances.

Thus, the present inventor has started investigating the crystalline substances whose structures are based on $SiS_4$, $PO_4$, $PS_4$ and $PN_4$ tetrahedrons. Then, he aimed at constructing substance systems which are appropriate for the lithium ion diffusion, and at applying them to solid electrolytes for secondary batteries.

SUMMARY OF THE INVENTION

The present inventor investigated into $Li_2S$-$GeS_2$-$Ga_2S_3$, $Li_2S$-$GeS_2$-ZnS and $Li_2S$-$GeS_2$-$P_2S_5$ ternary systems for novel substances, and revealed whether the electrochemical characteristics of the investigated novel substances are appropriate for solid electrolytes. As a result, he discovered that one of the $Li_2S$-$GeS_2$-$Ga_2S_3$ ion conductors exhibited a remarkably high ion conductivity of $6.49 \times 10^{-5}$ $Scm^{-1}$ at room temperature. Thus, he completed the present invention.

A lithium-ion-conductive solid electrolyte according to the present invention comprises:

a lithium-ion-conductive substance expressed by a general formula $li_2S$-$GeS_2$-X wherein "X" is at least one member selected from the group consisting of $Ga_2S_3$ and ZnS, or by a general formula $Li_2S$-$SiS_2$-$P_2S_5$.

The present lithium-ion-conductive solid electrolyte is a novel substance whose composition differs from those of the conventional lithium-ion solid electrolytes. Moreover, the present lithium-ion-conductive solid electrolyte is crystalline. In addition, the present lithium-ion-conductive solid electrolyte having a specific composition exhibits a remarkably high ion conductivity of $6.49 \times 10^{-5}$ $Scm^{-1}$ at room temperature.

A solid-electrolyte lithium battery according to the present invention employs the above-described lithium-ion-conductive substance as a solid electrolyte. Namely, the present solid-electrolyte lithium battery comprises, the solid electrolyte, a cathode, and an anode. The present solid-electrolyte lithium battery is superb in terms of stability and safety at elevated temperatures, since the electrolyte is a crystalline solid which can exhibit a high ion conductivity.

The present lithium-ion-conductive solid electrolyte can be crystalline, and accordingly can exhibit a high lithium-ion conductivity. The lithium-ion-conductive solid electrolyte can be used as the solid electrolyte for the present solid-electrolyte lithium battery, since it is stable and safe at elevated temperatures.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally decribed the present invention, a further understanding can be obtained by reference to the specific preferred embodiments which are provided herein for purposes of illustration only and are not intended to limit the scope of the appended claims.

The present lithium-ion-conductive solid electrolyte is expressed by a general formula $Li_2S$-$GeS_2$-X or $Li_2S$-$SiS_2$-$P_2S_5$. In the former general formula, "X" is at least one member selected from the group consisting of $Ga_2S_3$ and ZnS. The present lithium-ion-conductive solid electrolyte can be crystalline.

According to the research and development carried out until the present invention was applied for a patent protection in Japan, the present lithium-ion-conductive solid electrolyte can preferably include $Li_2S$, $GeS_2$ and X in a molar ratio of $Li_2S$:$GeS_2$:X=(from 0.25 to 6):(from 0 (not inclusive) to 1):(from 0 (not inclusive) to 1), further preferably $Li_2S$:$GeS_2$:X=(from 2.2 to 2.3):(from 0.5 to 0.8): (from 0.1 to 2.5).

Figure 1A:
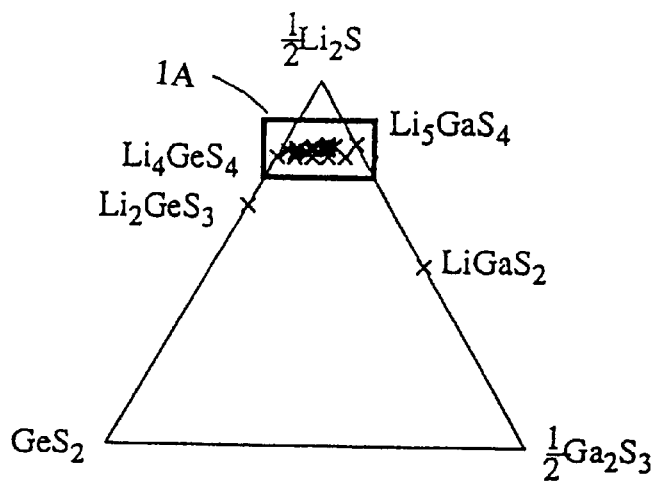
FIG. 1A is a ternary diagram on $Li_2S$-$GeS_2$-$Ga_2S_3$ three-component systems and FIG. 1B shows an enlarged view of detail 1A in FIG. 1A.
Figure 1B:
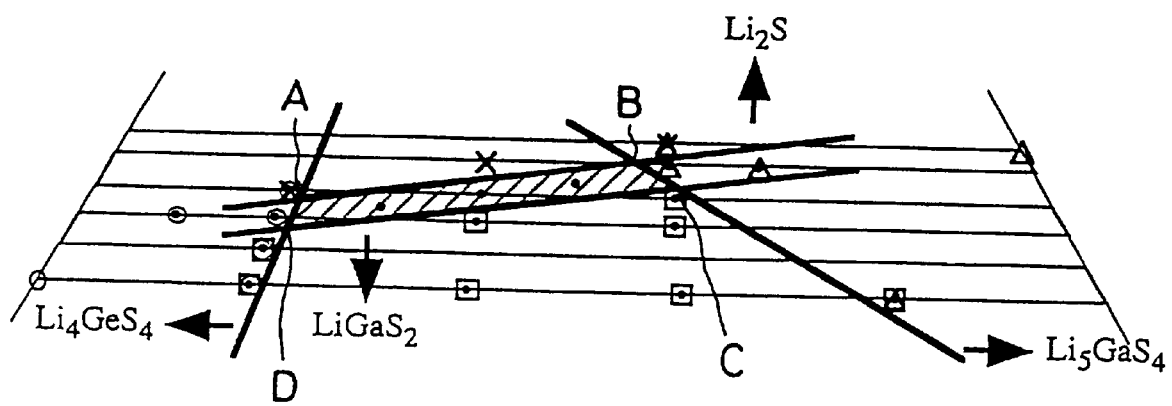

When $Ga_2S_3$ is used as "X", the present lithium-ion-conductive solid electrolyte can preferably have a composition which is surrounded by points "A", "B", "C" and "D" shown in a ternary system:$Li_2S$-$GeS_2$-$Ga_2S_3$ illustrated in accompanying FIG. 1B. At the point "A", the present lithium-ion-conductive solid electrolyte includes $Li_2S$, $GeS_2$ and $Ga_2S_3$ in a molar ratio of $Li_2S$:$GeS_2$:$Ga_2S_3$= 2.3:0.8:0.1. At the point "B", the present lithium-ion-conductive solid electrolyte includes $Li_2S$, $GeS_2$ and $Ga_2S_3$ in a molar ratio of $Li_2S$:$GeS_2$:$Ga_2S_3$=2.5:0.4:0.3. At the point "C", the present lithium-ion-conductive solid electrolyte includes $Li_2S$, $GeS_2$ and $Ga_2S_3$ in a molar ratio of $Li_2S$:$GeS_2$:$Ga_2S_3$=2.3:0.4:0.3. At the point "D", the present lithium-ion-conductive solid electrolyte includes $Li_2S$, $GeS_2$ and $Ga_2S_3$ in a molar ratio of $Li_2S$:$GeS_2$:$Ga_2S_3$=2.1:0.8:0.1.

Specifically, in the composition range surrounded by the points "A", "B", "C" and "D", a novel compound was confirmed to exist. The novel compound had an orthorhombic system, and the three axes had lengths "a"=7.943 Å, "b"=13.779 Å and "c"=6.160 Å. All the reflections by planes of atoms in the novel compound could be indexed. According to the ternary diagram shown in FIG. 1A, $Li_2S$ was present in the area where $Li_2S$ was in excess; $LiGa_2$ was present in the lower area where $Li_2S$ was scarce; $Li_4GeS_4$ was present in the left-hand side area where $GeS_2$ was in excess; and $Li_5GaS_4$ was present in the right-hand side area where $Ga_2S_3$ was in excess. Thus, the novel compound was found to exist as a solid solution in the composition area surrounded by the points "A", "B", "C" and "D" specified in accompanying FIG. 1B. Note that the present lithium-ion-conductive solid electrolyte or the solid solution can be expressed by a chemical formula $Li_{4+x+d}(Ge_{1-x}Ga_x)_{1-d}S_4$, wherein the value "x" falls in the range of 0.2<"x"<0.6, and the value "d" falls in the range of 0.00<"d"<0.05.

When the present lithium-ion-conductive solid electrolyte is expressed by a general formula $Li_2S$-$GeS_2$-$Ga_2S_3$, the present lithium-ion-conductive solid electrolyte having the following compositions exhibits a high lithium-ion conductivity: the present lithium-ion-conductive solid electrolyte including $Li_2S$, $GeS_2$ and $Ga_2S_3$ in a molar ratio of $Li_2S$:$GeS_2$:$Ga_2S_3$=2.2:0.8:0.1; the present lithium-ion-conductive solid electrolyte including $Li_2S$, $GeS_2$ and $Ga_2S_3$ in a molar ratio of $Li_2S$:$GeS_2$:$Ga_2S_3$=2.225:0.75:0.125; and the present lithium-ion-conductive solid electrolyte including $Li_2S$, $GeS_2$ and $Ga_2S_3$ in a molar ratio of $Li_2S$;$GeS_2$:$Ga_2S_3$=2.25:0.7:0.15.

When ZnS is used as "X", the present lithium-ion-conductive solid electrolyte can be expressed by a chemical formula $Li_{4-2y}Ge_{1-y}Zn_yS_4$. If such is the case, the value "y" can preferably fall in the range of 0<"y"<0.1. When the present lithium-ion-conductive solid electrolyte includes $Li_2S$, $GeS_2$ and Zns in a molar ratio of $Li_2S$:$GeS_2$:ZnS= 1:1:1, it can be prepared as crystals which include a single phase. In addition, the present lithium-ion-conductive solid electrolyte can preferably include $Li_2S$, $GeS_2$ and ZnS in a molar ratio of $Li_2S$:$GeS_2$:ZnS=(from 1.0 to 2.0):1.0:(from 0.0 to 1.0), further preferably $Li_2S$;$GeS_2$:ZnS=(from 1.8 to 2.0):1.0:0.0, furthermore preferably $Li_2S$:$GeS_2$:ZnS= (2.0:1.0:0.0)–(1.0:1.0:1.0).

The present lithium-ion-conductive solid electrolyte can be expressed by a general formula $Li_2S$-$SiS_2$-$P_2S_5$. If such is the case, the present lithium-ion-conductive solid electrolyte can be prepared as a novel crystalline compound when it includes $Li_2S$, $SiS_2$ and $P_2S_5$ in a molar ratio at around $Li_2S$:$SiS_2$:$P_2S_5$=1.9:0.8:0.1. In addition, the present lithium-ion-conductive solid electrolyte can preferably include $Li_2S$, $SiS_2$ and $P_2S_5$ in a molar ratio of $Li_2S$:$SiS_2$:$P_2S_5$=(from 1.5 to 2.0):(from 0.0 to 1.0):(from 0.0 to 0.5), further preferably $Li_2S$:$SiS_2$:$P_2S_5$=(from 1.6 to 1.8):(from 0.2 to 0.6):(from 0.2 to 0.4), furthermore preferably $Li_2S$:$SiS_2$:$P_2S_5$= (1.5:0.0:0.5)–(2.0:1.0:0.0).

The present solid-electrolyte lithium battery employs the above-described present lithium-ion-conductive substance as the solid electrolyte. The following can be used as the cathode and anode of the present solid-electrolyte lithium battery: $LiCoO_2$, $LiNiO_2$, $LiMn_2O_4$-carbon, $SnO_2$ and In. The cathode can preferably include a mixture of a cathode active material and the present lithium-ion-conductive substance. The anode can preferably include a mixture of an anode active material and the present lithium-ion-conductive substance.

Preferred Embodiments (a) Synthesis of Lithium-Ion-Conductive Substances (Synthesis of $Li_2S$-$GeS_2$-$Ga_2S_3$ Lithium-Ion-Conductive Substance)

The followings substances were used as the starting materials for the synthesis:

- $Li_2S$ made by "KOH-JUNDO KAGAKU KENKYUSHO" Co., Ltd., and having a purity of 99% or up;
- $GeS_2$ made by "KOH-JUNDO KAGAKU KENKYUSHO" Co., Ltd., and having a purity of 99.99% or up; and
- $Ga_2S_3$ made by "KOH-JUNDO KAGAKU KENKYUSHO" Co., Ltd., and having a purity of 99.99%.

The starting materials were weighed by appropriate amounts in a dry box whose atmosphere was replaced with argon, and were mixed by using an alumina mortar and a pestle therein.

The synthesis was carried out in two ways: namely; a powdered synthesis; and a pelletized synthesis. In the powdered syntheses, the powdered specimens were sealed in a silica tube in vacuum. The silica tube was carbon-coated, and had an inside diameter of 6.5 mm and a thickness of 0.8 mm. In the pelletized synthesis, the mixed specimens were first formed as pellets having a diameter of 7.1 mm, and were then sealed in a silica tube in vacuum. The silica tube was carbon-coated, and had an inside diameter of 8.5 mm and a thickness of 0.8 mm. Thereafter, the silica tubes were heated at 700° C. for 8 hours to react the starting materials. The silica tubes were carbon-coated in the following manner: acetone was put into silica tubes in a small amount; and the silica tubes were heated rapidly in an electric furnace whose temperature was held at 950° C.

II Synthesis of $Li_2S$-$GeS_2$-ZnS Lithium-Ion-Conductive Substance

The following substances were used as the starting materials for the synthesis:

- $Li_2S$ made by "KOH-JUNDO KAGAKU KENKYUSHO" Co., Ltd., and having a purity of 99%;
- $GeS_2$ made by "KOH-JUNDO KAGAKU KENKYUSHO" Co., Ltd., and having a purity of 99.99%; and
- ZnS made by "NAKARAI TESUKU" Co., Ltd., and having a purity of 99.99%.

Except that the aforementioned starting materials were prepared, the synthesis of an $Li_2S$-$GeS_2$-ZnS lithium-ion-conductive substance was carried out in the same manner as the above-described synthesis of the $Li_2S$-$GeS_2$-$Ga_2S_3$ lithium-ion-conductive substance.

III Synthesis of $Li_2S$-$SiS_2$-$P_2S_5$ Lithium-Ion-Conductive Substance

The followings substances were used as the starting materials for the synthesis:

- $Li_2S$ made by "KOH-JUNDO KAGAKU KENKYUSHO" Co., Ltd., and having a purity of 99%;
- $SiS_2$ made by "KOH-JUNDO KAGAKU KENKYUSHO" Co., Ltd., and having a purity of 99.99%; and
- $P_2S_5$ made by "KOH-JUNDO KAGAKU KENKYUSHO" Co., Ltd., and having a purity of 98%.

Except that the aforementioned starting materials were prepared, the synthesis of an $Li_2S$-$SiS_2$-$P_2S_5$ lithium-ion-conductive substance was carried out in the same manner as the above-described synthesis of the $Li_2S$-$GeS_2$-$Ga_2S_3$ lithium-ion-conductive substance.

(b) Powder X-ray Diffraction Measurement

A powder X-ray diffraction measurement was employed in order to collect data for identifying the synthesized product specimens and analyzing their structures. As for an X-ray diffractometer, "Geiger Flex RAD-IA" made by "RIGAKU DENKI" Co., Ltd. was used. In order to carry out the measurement in an argon atmosphere, a special holder was prepared. The holder was made from stainless steel, and was sealed with an aluminum foil. The aluminum foil had a thickness of 7 μm. The data were collected by a stepwise scanning method, in which the FT measurement was carried out at sampling positions, under the following conditions:

Tube Voltage: 40 kV;
Tube Current: 150 mA;
Measurement Range: $10° \leq 2\theta \leq 110°$; and
Stepping Interval: 0.04°.

Moreover, the structures of the synthesized product specimens were analyzed by using the program, "RIETAN97β".

(c) Ion Conductivity Measurement

The ion conductivity of the resulting product specimens was measured by using the alternate current impedance method. In order to carry out the measurement, "Impedance/Gain Phase Analyzer S11260" made by "Solar Toron" Co., Ltd. was used. As for the best specimens, the synthesized product specimens were formed as a pellet, and the resultant pelletized specimens were ground on the surfaces by a sandpaper. Then, a gold paste was applied on the test specimens. The gold paste worked as an electrode. Thereafter, the gold paste was dried in vacuum at 130° C. for 3 hours, thereby evaporating an organic solvent included in the gold paste. Finally, the test specimens were sealed in a silica tube in vacuum, and were heated to bake the gold paste thereon at 350° C. for 5 hours. The silica tube had an inside diameter of 8.5 mm and a thickness of 0.8 mm. The measurement of the ion conductivity was carried out in an $N_2$ atmosphere whose content of $N_2$ was 99.999%. The data were collected under the following conditions:

Applied Voltage: 10 mV;
Accumulated Time: 7 seconds;
Sampling Points: 50 points in the frequency range of from 1 Hz to 10 MHz or from 0.1 Hz or 1 MHz; and
Temperature Range: from room temperature to 300° C.

The thus obtained data were analyzed by using the program, "ZPlot".

(d) Decomposition Voltage Measurement

The decomposition voltage was measured by applying a constant voltage to the test specimens in the range of from 0 to 10 V. The data were collected by reading the magnitudes of the currents which flowed in the test specimens at the constant voltage.

(e) All-Solid Battery Preparation

A material for the cathode was prepared by mixing $LiCoO_2$ in an amount of 0.1 g, each of the synthesized lithium-ion-conductive substances in an amount of 0.135 g and acetylene black in an amount of 0.01 g. The acetylene black worked as a conductor. A material for the anode was prepared by mixing an indium powder in an amount of 0.1 g and each of the synthesized lithium-ion-conductive substances in an amount of 0.065 g.

The cathode material, each of the synthesized lithium-ion-conductive substances and the anode material were laminated in three layers to prepare all-solid batteries for testing. Note that the synthesized lithium-ion-conductive substances were weighed by 0.7 g, respectively.

(f) Results of Measurements

I Synthesis and Identification of $Li_2S$-$GeS_2$-$Ga_2S_3$ Lithium-Ion-Conductive Substance FIG. 1A illustrates a ternary diagram on the $Li_2S$-$GeS_2$-$Ga_2S_3$ three-component system. In FIG. 1B, the positions marked with dots (•) specify the compositions of the synthesized substances. As shown in FIG. 1B, the synthesized substances whose compositions lay in the area surrounded by the points "A", "B", "C" and "D" specified in FIG. 1B exhibited novel X-ray diffraction patterns which resulted from novel compounds. Here, at the point "A", the composition of $Li_2S$, $GeS_2$ and $Ga_2S_3$ was $Li_2S:GeS_2:Ga_2S_3=$ 2.3:0.8:0.1 in a molar ratio. At the point "B", the composition of $Li_2S$, $GeS_2$ and $Ga_2S_3$ was $Li_2S:GeS_2:Ga_2S_3=$ 2.5:0.4:0.3 in a molar ratio. At the point "C", the composition of $Li_2S$, $GeS_2$ and $Ga_2S_3$ was $Li_2S:GeS_2:Ga_2S_3=$2.3:0.4:0.3 in a molar ratio. At the point "D", the composition of $Li_2S$, $GeS_2$ and $Ga_2S_3$ was $Li_2S:GeS_2:Ga_2S_3=$2.1:0.8:0.1 in a molar ratio.

Figure 2:
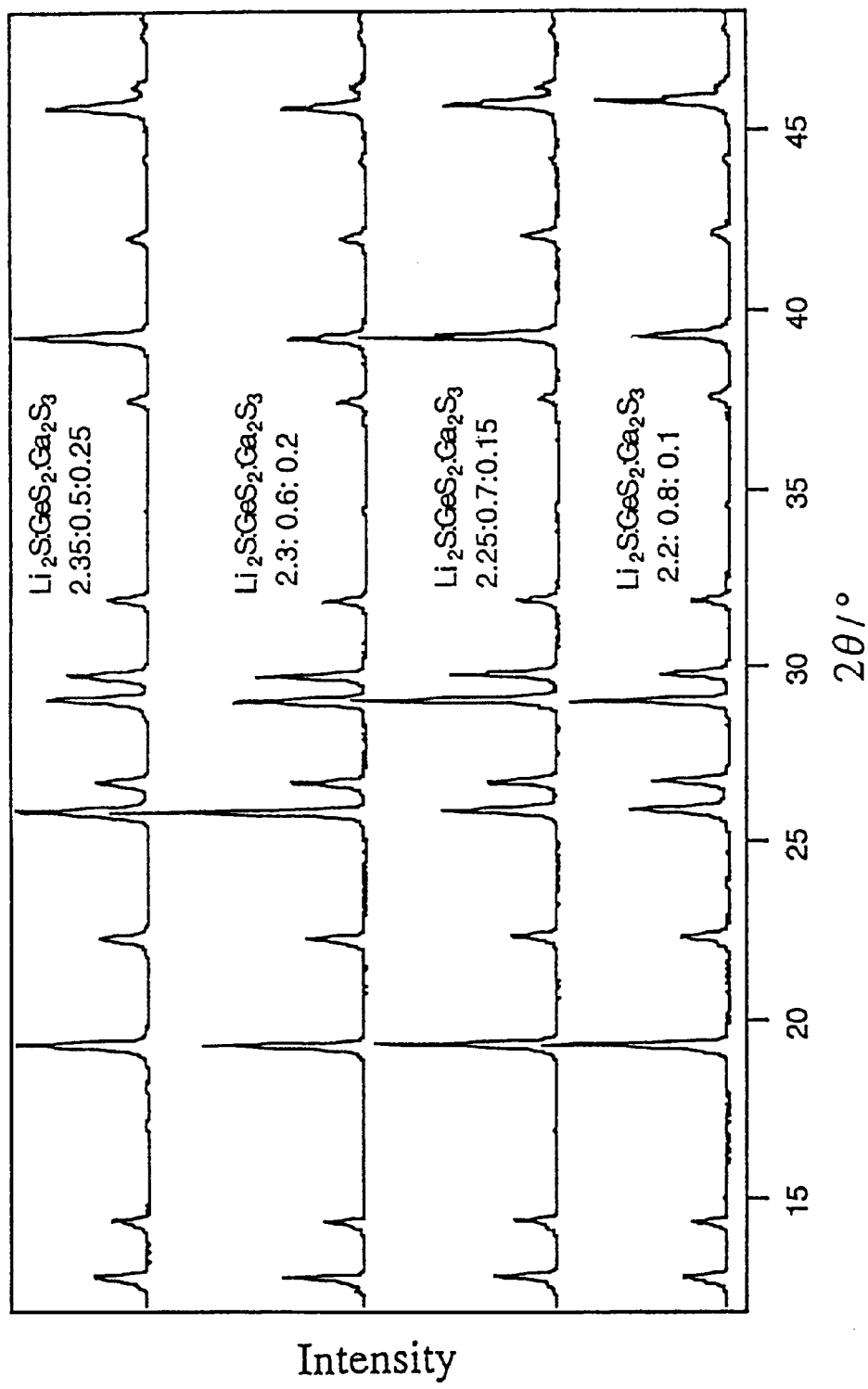
FIG. 2 is an X-ray diffraction chart on substances which were synthesized so that their compositions lay in the area surrounded by the points "A", "B", "C" and "D" specified in FIG. 1B.
Figure 3:
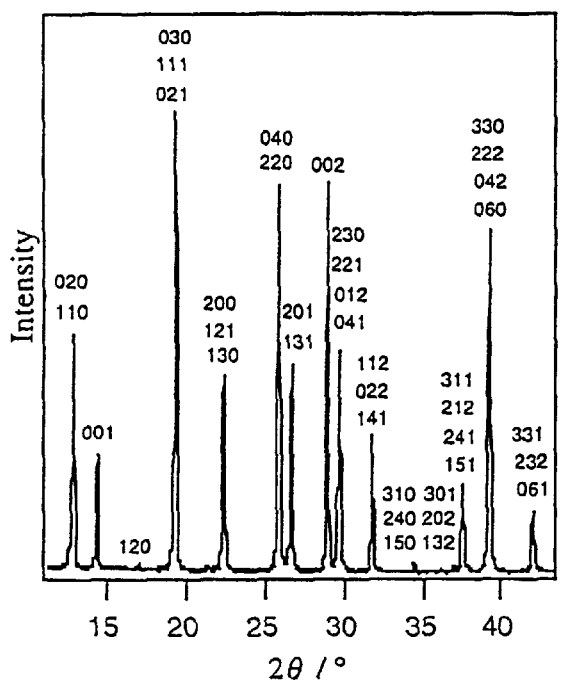
FIG. 3 is an indexed X-ray diffraction chart in which the X-ray diffraction chart shown in FIG. 2 is indexed by an orthohombic cell.

FIG. 2 illustrates X-ray diffraction patterns which were exhibited by the aforementioned novel substances. FIG. 3 shows an X-ray diffraction pattern indexed by an orthorhombic cell. According to FIGS. 2 and 3, the novel substances had an orthorhombic system, and could be indexed by the three axes, "a"=7.943 Å, "b"=13.779 Å and "c"=6.160 Å. In the novel substances, a broad solid solution area was present. According to FIG. 1B, $Li_2S$ was confirmed to exist on the upper side of the area surrounded by the points "A", "B", "C" and "D" where $Li_2S$ was in excess; $LiGaS_2$ was confirmed to exist on the lower side of the area where $Li_2S$ was scarce; $Li_4GeS_4$ was confirmed to exist on the left-hand side of the area where $GeS_2$ was in excess; and $Li_5GaS_4$ was confirmed to exist on the right-hand side of the area where $Ga_2S_3$ was in excess. The solid solution could be expressed by a chemical formula $Li_{4+x+d}(Ge_{1-x}Ga_x)_{1-d}S_4$. In the solid solution area, the value "x" could be judged to fall in the range of $0.2<$"x"$<0.6$. Moreover, the axes "a" and "b" were reduced as the value "x" was decreased.

Figure 4:
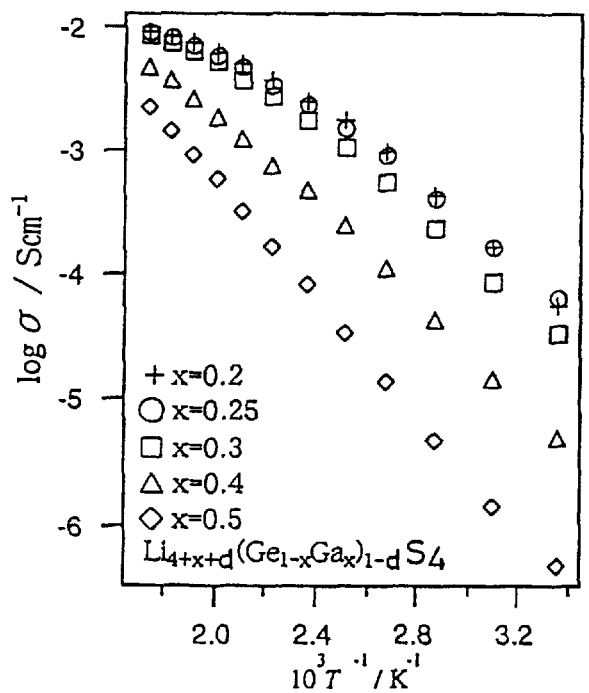
FIG. 4 is a scatter diagram for illustrating the temperature dependency of the ion conductivity exhibited by preferred embodiments of the present ion conductor whose composition is expressed by a general formula $Li_{4+x+d}(Ge_{1-x}Ga_x)_{1-d}S_4$.

FIG. 4 shows the temperature dependency of the ion conductivity which was exhibited by the above-described synthesized substances. The compositions of the synthesized substances were expressed by the general formula $Li_{4+x+d}(Ge_{1-x}Ga_x)_{1-d}S_4$ wherein the value "x" was fixed at 0.2, 0.25, 0.3, 0.4 and 0.5, and the value "d" was fixed at 0.025. According to FIG. 4, the ion conductivity was increased as the content of $GeS_2$ was increased. When one of the synthesized substances included $Li_2S$, $GeS_2$ and $Ga_2S_3$ in a molar ratio of $Li_2S:GeS_2:Ga_2S_3=2.225:0.75:0.125$;namely; when it had a composition expressed by $Li_{4.34}Ge_{0.73}Ga_{0.24}S_4$, it exhibited the ion conductivity of $6.49\times10^{-5}$ Scm$^{-1}$ (i.e., $\delta=6.49\times10^{-5}$ Scm$^{-1}$) at room temperature.

Figure 5:
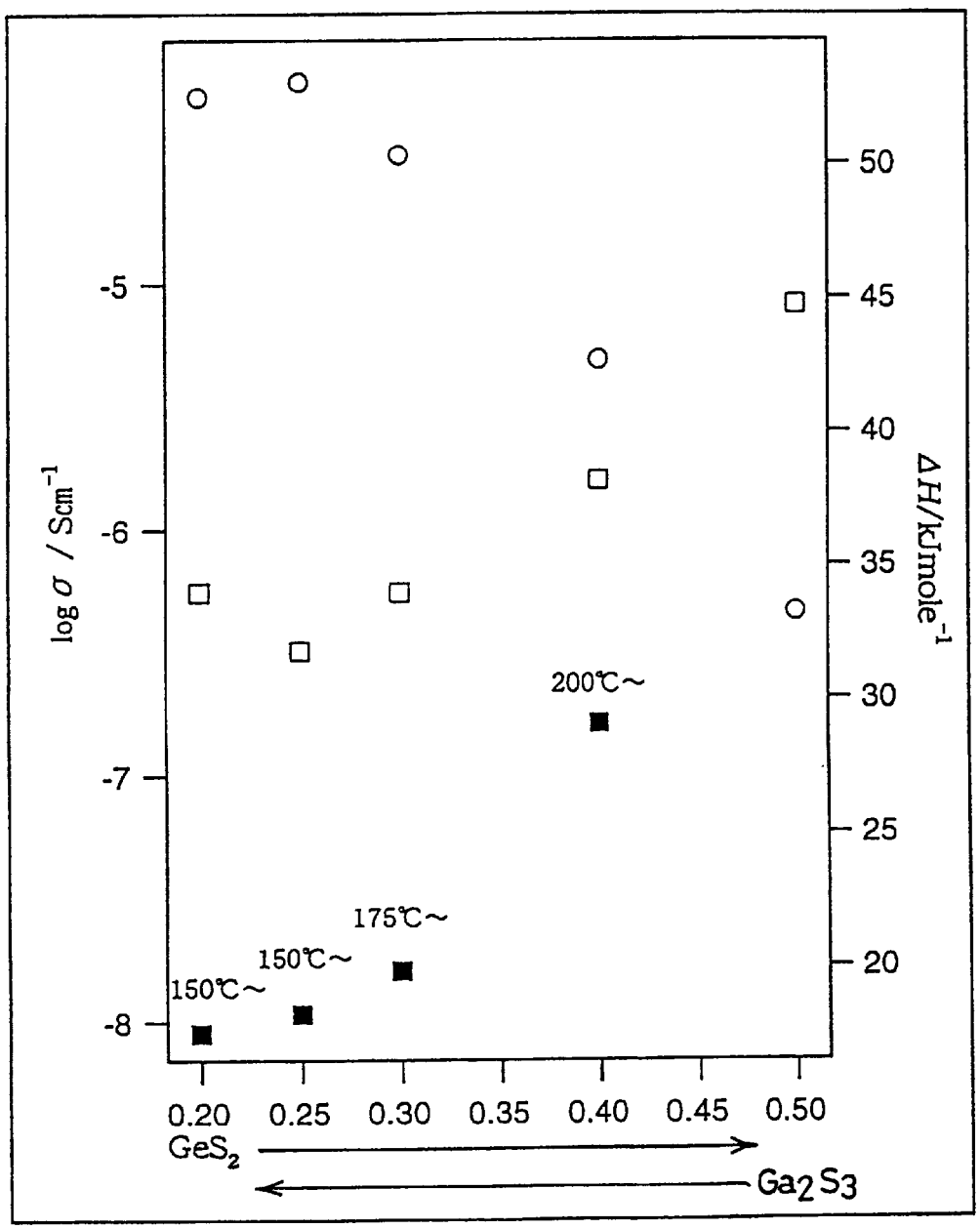
FIG. 5 is a scatter diagram for illustrating the ion conductivity and activation energy exhibited by preferred embodiments of the present ion conductor whose composition is expressed by a general formula $Li_{4+x+d}(Ge_{1-x}Ga_x)_{1-d}S_4$.

FIG. 5 illustrates the variations of the ion conductivity and activation energy with respect to the compositional variation of the aforementioned synthesized substances. Note that the blank circles (○) exhibit the ion conductivity at room temperature, that the blank squares (□) exhibit the activation energy at room temperature, and that the solid squares (■) exhibit the activation energy at specific temperatures. As the content of $GeS_2$ was increased, the synthesized substances exhibited the diminishing ion conductivity at room temperature. When one of the synthesized substances included $GeS_2$ and $Ga_2S_3$ in a molar ratio of $GeS_2:Ga_2S_3=0.25:0.75$, it exhibited the maximum ion conductivity at room temperature. On the contrary, as the content of $GeS_2$ was increased, the synthesized substances exhibited the enlarging activation energy. When one of the synthesized substances included $GeS_2$ and $Ga_2S_3$ in a molar ratio of $GeS_2:Ga_2S_3=$0.25:0.75, it exhibited the minimum activation energy of 31.8 kJ/mole at room temperature. In particular, this synthesized substance exhibited the activation energy of 18.2 kJ/mole at a temperature of 150° C. or more. The small activation energy is the characteristic property of a conductor having a high ion conductivity.

In addition, constant voltages ranging from 0 to 10 V were applied to one of the above-described synthesized substances, and the currents flowed therein were measured. This synthesized substance included $Li_2S$, $GeS_2$ and $Ga_2S_3$ in a molar ratio of $Li_2S:GeS_2:Ga_2S_3=2.2:0.8:0.1$. As the constant voltage was decreased the current ws increased gradually. However, no abrupt current increment was observed which resulted from the decomposition of test speciment. Moreover, the current flowing in the synthesized substance was extremely small. Hence, it is believed that synthesized substance was stable up to 10 V.

Figure 6:
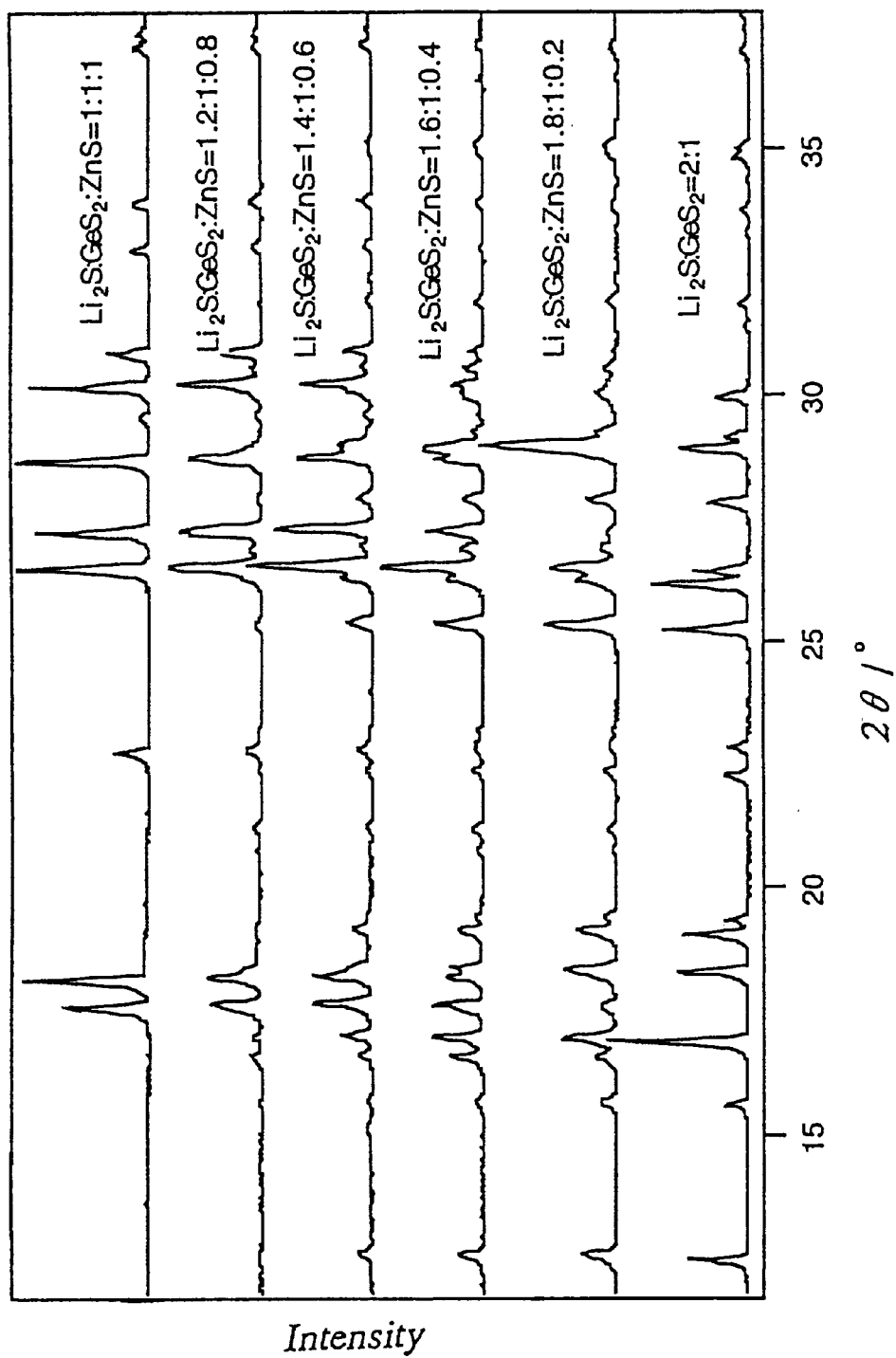
FIG. 6 is an X-ray diffraction chart on $Li_2S$-$GeS_2$-$ZnS$ lithium-ion conductive substances.

II Synthesis and Identification of $Li_2S$-$GeS_2$-ZnS Lithium-Ion-Conductive Substance FIG. 6 illustrates the X-ray diffraction patterns which were exhibited by the $Li_2S$-$GeS_2$-ZnS lithium-ion-conductive substances synthesized as described above. As the content of ZnS was increased, the peak resulting from $Li_2GeZnS_4$ was enlarged. When one of the $Li_2S$-$GeS_2$-ZnS lithium-ion conductive substances included $Li_2S$, $GeS_2$ and ZnS in a molar ratio of $Li_2S:GeS_2:ZnS=1:1:1$, a single phase could be obtained.

Moreover, the $Li_2GeZnS_4$ was subjected to the "RIETVELD" analysis in which the values stemming from the space group and atomic coordinates of the $Li_2GeZnO_4$ oxide were applied to those of the space group and atomic coordinates of the $Li_2GeZnS_4$. According to the analysis, a reliable result, S=2.277, could be obtained. Thus, it was found that the structure of the sulfide and that of the oxide resembled with each other.

Hence, it is believed that the $Li_2GeZnS_4$ had a framework structure in which the apexes of the constituent tetrahedrons were shared in the direction of the "c" axis. The tetrahedrons were herein constituted by $LiS_4$, $GeS_4$ and $ZnS_4$, respectively. Specifically, the tetrehedrons were oriented in a predetermined direction. Thus, it is believed that the $Li_2GeZnS_4$ had the same structure as that of the low-temperature-phase $\beta$-$Li_2PO_4$.

III Synthesis and Identification of $Li_2S$-$SiS_2$-$P_2S_5$ Lithium-Ion-Conductive Substance According to the results of the X-ray diffraction analysis on the synthesized test specimens, the test specimens were found to involve a novel solid solution when they had a composition which lay at around $Li_2S:SiS_2:P_2S_5=$2.0:0.8:0.1 in a molar ratio.

Having now fully described the present invention, it will be apparent to one of ordinary skill in the art that many changes and modifications can be made thereto without departing from the spirit or scope of the present invention as set forth herein including the appended claims.

What is claimed is:

1. A lithium-ion-conductive solid electrolyte, comprising:
a crystalline lithium-ion-conductive substance expressed by a general formula $Li_2S$-$GeS_2$-X wherein "X" is at least one member selected from the group consisting of $Ga_2S_3$ and ZnS.

2. The lithium-ion-conductive solid electrolyte according to claim 1, wherein said lithium-ion-conductive substance includes $Li_2S$, $GeS_2$ and X in a molar ratio of $Li_2S:GeS_2:X=$ (from 0.25 to 6):(from 0 (not inclusive to 1):(from 0 (not inclusive) to 1).

3. The lithium-ion-conductive solid electrolyte according to claim 2, wherein said crystalline lithium-ion-conductive substance includes $Li_2S$, $GeS_2$ and X in a molar ratio of $Li_2S:GeS_2:X=$(from 2.2 to 2.3):(from 0.5 to 0.8):(from 0.1 to 0.25).

4. The lithium-ion-conductive solid electrolyte according to claim 1, wherein said crystalline lithium-ion-conductive substance has a composition being surrounded by points "A", "B", "C" and "D" shown in a ternary system: $Li_2S$-$GeS_2$-$Ga_2S_3$ illustrated in accompanying FIG. 1.

5. The lithium-ion-conductive solid electrolyte according to claim 1, wherein said crystalline lithium-ion-conductive substance includes $Li_2S$, $GeS_2$ and $Ga_2S_3$ in a molar ratio of $Li_2S:GeS_2:Ga_2S_3=2.2:0.8:0.1$.

6. The lithium-ion-conductive solid electrolyte according to claim 1, wherein said crystalline lithium-ion-conductive substance includes $Li_2S$, $GeS_2$ and $Ga_2S_3$ in a molar ratio of $Li_2S:GeS_2:Ga_2S_3=2.225:0.75:0.125$.

7. The lithium-ion-conductive solid electrolyte according to claim 1, wherein said crystalline lithium-ion-conductive substance includes $Li_2S$, $GeS_2$ and $Ga_2S_3$ in a molar ratio of $Li_2S:GeS_2:Ga_2S_3=2.25:0.7:0.15$.

8. The lithium-ion-conductive solid electrolyte according to claim 1, wherein said crystalline lithium-ion-conductive substance is expressed by a chemical formula $Li_{4+x+d}(Ge_{1-x}Ga_x)_{1-d}S_4$.

9. The lithium-ion-conductive solid electrolyte according to claim 8, wherein the value "x" falls in the range of $0.2<"x"<0.6$.

10. The lithium-ion-conductive solid electrolyte according to claim 1, wherein said crystalline lithium-ion-conductive substance is expressed by a chemical formula $Li_{4-2y}Ge_{1-y}Zn_yS_4$.

11. The lithium-ion-conductive solid electrolyte according to claim 10, wherein the value "y" falls in the range of $0<"y"<0.1$.

12. The lithium-ion-conductive solid electrolyte according to claim 1, wherein said crystalline lithium-ion-conductive substance includes $Li_2S$, $GeS_2$ and ZnS in a molar ratio of $Li_2S:GeS_2:ZnS$=(from 1.0 to 2.0):(1.0:(from 0.0 to 1.0).

13. A lithium-ion-conductive solid electrolyte, comprising:

a crystalline lithium-ion-conductive substance expressed by a general formula $Li_2S$-$SiS_2$-$P_2S_5$.

14. The lithium-ion-conductive solid electrolyte according to claim 13, wherein said crystalline lithium-ion-conductive substance includes $Li_2S$, $SiS_2$ and $P_2S_5$ in a molar ratio of $Li_2S:SiS_2:P_2S_5$=(from 1.5 to 2.0):(from 0.0 to 1.0):(from 0.0 to 0.5).

15. A solid-electrolyte lithium battery comprising:

a solid electrolyte including a crystalline lithium-ion-conductive substance, the crystalline lithium-ion-conductive substance expressed by at least one general formula selected from the group consisting of $Li_2S$-$GeS_2$-X wherein "X" is at least one member selected from the group consisting of $Ga_2S_3$ and ZnS, and $Li_2S$-$SiS_2$-$P_2S_5$;

a cathode; and an anode.

16. The solid-electrolyte lithium battery according to claim 15, wherein the cathode includes a mixture of a cathode active material and the crystalline lithium-ion conductive substance; and the anode includes a mixture of an anode active material and the crystalline lithium-ion conductive substance.

* * * * *